(12) United States Patent
Trinh et al.

(10) Patent No.: US 8,695,728 B2
(45) Date of Patent: Apr. 15, 2014

(54) FORMATION EVALUATION USING A BIT-BASED ACTIVE RADIATION SOURCE AND A GAMMA RAY DETECTOR

(75) Inventors: Tu Tien Trinh, Houston, TX (US); Eric Sullivan, Houston, TX (US); David A. Curry, Askett (GB); Xiaomin C. Cheng, The Woodlands, TX (US); Feyzi Inanc, Spring, TX (US); Yi Liu, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 407 days.

(21) Appl. No.: 13/088,892

(22) Filed: Apr. 18, 2011

(65) Prior Publication Data

US 2011/0253448 A1 Oct. 20, 2011

Related U.S. Application Data

(60) Provisional application No. 61/325,423, filed on Apr. 19, 2010.

(51) Int. Cl.
*E21B 47/00* (2012.01)
*G01V 5/08* (2006.01)

(52) U.S. Cl.
CPC .. *G01V 5/08* (2013.01); *E21B 47/00* (2013.01)
USPC .................................. 175/41; 175/40; 175/50

(58) Field of Classification Search
USPC ................................................ 175/40, 41, 50
See application file for complete search history.

(56) References Cited

U.S. PATENT DOCUMENTS

| 5,475,309 | A | 12/1995 | Hong et al. |
| 5,720,355 | A | 2/1998 | Lamine et al. |
| 5,969,359 | A | 10/1999 | Ruddy et al. |
| 6,150,822 | A | 11/2000 | Hong et al. |
| 6,230,822 | B1 | 5/2001 | Sullivan et al. |
| 6,419,032 | B1 | 7/2002 | Sullivan et al. |
| 6,540,033 | B1 | 4/2003 | Sullivan et al. |
| 6,543,312 | B2 | 4/2003 | Sullivan et al. |
| 6,571,886 | B1 | 6/2003 | Sullivan et al. |
| 6,626,251 | B1 | 9/2003 | Sullivan et al. |
| 6,769,497 | B2 | 8/2004 | Dubinsky et al. |
| 7,046,165 | B2 | 5/2006 | Beique et al. |
| 7,058,512 | B2 | 6/2006 | Downton |
| 7,066,280 | B2 | 6/2006 | Sullivan et al. |
| 7,278,499 | B2 | 10/2007 | Richert et al. |
| 7,308,937 | B2 | 12/2007 | Radford et al. |
| 7,350,568 | B2 | 4/2008 | Mandal et al. |

(Continued)

FOREIGN PATENT DOCUMENTS

EP 1431510 A2 6/2004

OTHER PUBLICATIONS

Dateline Los Almos, a Monthly Publication of Los Almos National Laboratory, January Issue 1997, pp. 1-8.

(Continued)

*Primary Examiner* — Cathleen Hutchins
(74) *Attorney, Agent, or Firm* — Cantor Colburn LLP

(57) ABSTRACT

A drill bit made according to one embodiment includes a source configured to induce radiation into a formation during drilling of a wellbore and a sensor in the drill bit configured to detect radiation from the formation responsive to the radiation induced by the source. The drill bit may further include a circuit configured to process signals received from the sensor to estimate a property of the formation.

18 Claims, 3 Drawing Sheets

(56) References Cited

U.S. PATENT DOCUMENTS

| | | |
|---|---|---|
| 7,387,177 B2 | 6/2008 | Zahradnik et al. |
| 7,497,276 B2 | 3/2009 | Pastusek et al. |
| 7,506,695 B2 | 3/2009 | Pastusek et al. |
| 7,510,026 B2 | 3/2009 | Pastusek et al. |
| 7,571,770 B2 | 8/2009 | DiFoggio et al. |
| 7,763,845 B2 | 7/2010 | Estes et al. |
| 2001/0054514 A1 | 12/2001 | Sullivan et al. |
| 2004/0069539 A1 | 4/2004 | Sullivan et al. |
| 2004/0222018 A1 | 11/2004 | Sullivan et al. |
| 2007/0114062 A1 | 5/2007 | Hall et al. |
| 2007/0186639 A1 | 8/2007 | Spross et al. |
| 2008/0060848 A1 | 3/2008 | Pastusek et al. |
| 2008/0065331 A1 | 3/2008 | Pastusek et al. |
| 2008/0066959 A1 | 3/2008 | Pastusek et al. |
| 2008/0164062 A1 | 7/2008 | Brackin et al. |
| 2010/0089645 A1 | 4/2010 | Trinh et al. |

OTHER PUBLICATIONS

NETL: Oil & Natural Gas Projects, Harsh-Environment Solid-State Gamma Detector for Down-hole Gas and Oil Exploration, http://www.netl.doe.gov/technologies/oil-gas/NaturalGas/Projects_n/..., pp. 1-5.

Semiconductor-Based Radiation Detectors, http://sensors.lbl.gov/sn_semi.html, pp. 1-5.

XRF Corporation, About CZT Detectors, http://xrtcorp.com/technology/about_czt_detectors.html, 1 sheet.

ND A GAMMA RAY DETECTOR

CROSS-REFERENCES TO RELATED APPLICATIONS

This application claims priority from the U.S. Provisional Patent Application Ser. No. 61/325,423 filed Apr. 19, 2010.

BACKGROUND INFORMATION

1. Field of the Disclosure

This disclosure relates generally to drill bits that include sensors for providing measurements relating to detection of gamma rays from formations.

2. Brief Description of the Related Art

Oil wells (wellbores) are usually drilled with a drill string that includes a tubular member having a drilling assembly (also referred to as the bottomhole assembly or "BHA") with a drill bit attached to the bottom end thereof. The drill bit is rotated to disintegrate the earth formations to drill the wellbore. The BHA includes devices and sensors for providing information about a variety of parameters relating to the drilling operations, behavior of the BHA and formation surrounding the wellbore being drilled (formation parameters). A variety of sensors, including radiation detectors, generally referred to as logging-while-drilling (LWD) sensors or measurements-while-drilling (MWD) sensors, are disposed in the BHA for estimating properties of the formation. Radiation sensors whether for detecting gamma rays naturally occurring in the earth (passive measurement) or radiation emitted in the formation in response to induced radiation from a radiation source ("active measurement") are placed in the BHA. Such sensors are not close to the formation and may not provide high resolution results relating to distinguishing rock formations when the drill bit moves from one type of formation to another, such as from shale to sand or vice versa. Also, such placement of the radiation sensors does not provide information relating to the formation in front of the drill bit.

Therefore, there is a need for bit-based passive and active radiation sensors for improved estimation of formation properties during drilling of a wellbore.

SUMMARY

In one aspect, the present disclosure provides a drill bit that includes a bit body and a radiation sensor in the bit body. In one aspect, the radiation sensor is configured to detect naturally-occurring gamma rays from a formation being drilled (referred to herein as "passive mode"). In another aspect, the radiation sensor detects scattered radiation in response to radiation induced into the formation by a source (referred to herein as an "active mode") In one aspect, the source may be selectively activated and deactivated so that both the naturally-occurring and scattered rays may be detected during different time periods or windows. In one aspect, the source may be placed in the drill bit. The radiation sensor may be integrated into a cutter positioned on the bit body, in a shank or in any other suitable location. The source may be a naturally occurring gamma ray source such as potassium, uranium and/or thorium. The radiation source may be a gamma ray source or a neutron source. The radiation sensor may be a gamma radiation and/or neutron sensor.

In another aspect, the present disclosure provides a method of making a drill bit. The method, in one aspect, may include: providing a drill bit; placing a radiation sensor in the drill bit configured to detect radiation from a formation; placing a radiation source in the drill bit; providing a control circuit to selectively activate and deactivate the source during drilling of a wellbore in the formation.

In yet another aspect, the present disclosure provides a drilling system for use in drilling a wellbore in an earth formation. The drilling system may include a drill bit having a bit body positioned at an end of a drilling assembly; a radiation sensor placed in the drill bit and configured to provide signals representative of radiation detected from a formation being drilled; a source configured to induce radiation into the formation; and a processor configured to estimate a parameter of interest relating to the formation being drilled using signals received from the sensor. The desired parameter of interest may be a lithology of the formation and/or a bed boundary.

In yet another aspect, the present disclosure provides a method for drilling a wellbore in an earth formation. The method may include drilling the wellbore with a drill bit having a radiation sensor; detecting radiation from the formation being drilled, the detected radiation being one of naturally occurring gamma rays in the formation and/or radiation scattered in response to actively-induced radiation; and processing the detected radiation to estimate a property of interest relating to the formation.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

For detailed understanding of the present disclosure, references should be made to the following detailed description, taken in conjunction with the accompanying drawings in which like elements have generally been designated with like numerals and wherein.

DETAILED DESCRIPTION

The present disclosure relates to devices and methods for using radiation sensors in a drill bit for detecting, from formations being drilled, naturally-occurring gamma rays and radiation responsive to induced radiation by a source. The present disclosure is susceptible to embodiments of different forms. The drawings show and the written specification describes specific embodiments of the present disclosure with the understanding that the present disclosure is to be considered an exemplification of the principles of the disclosure, and is not intended to limit the disclosure to that illustrated and described herein.

Figure 1:
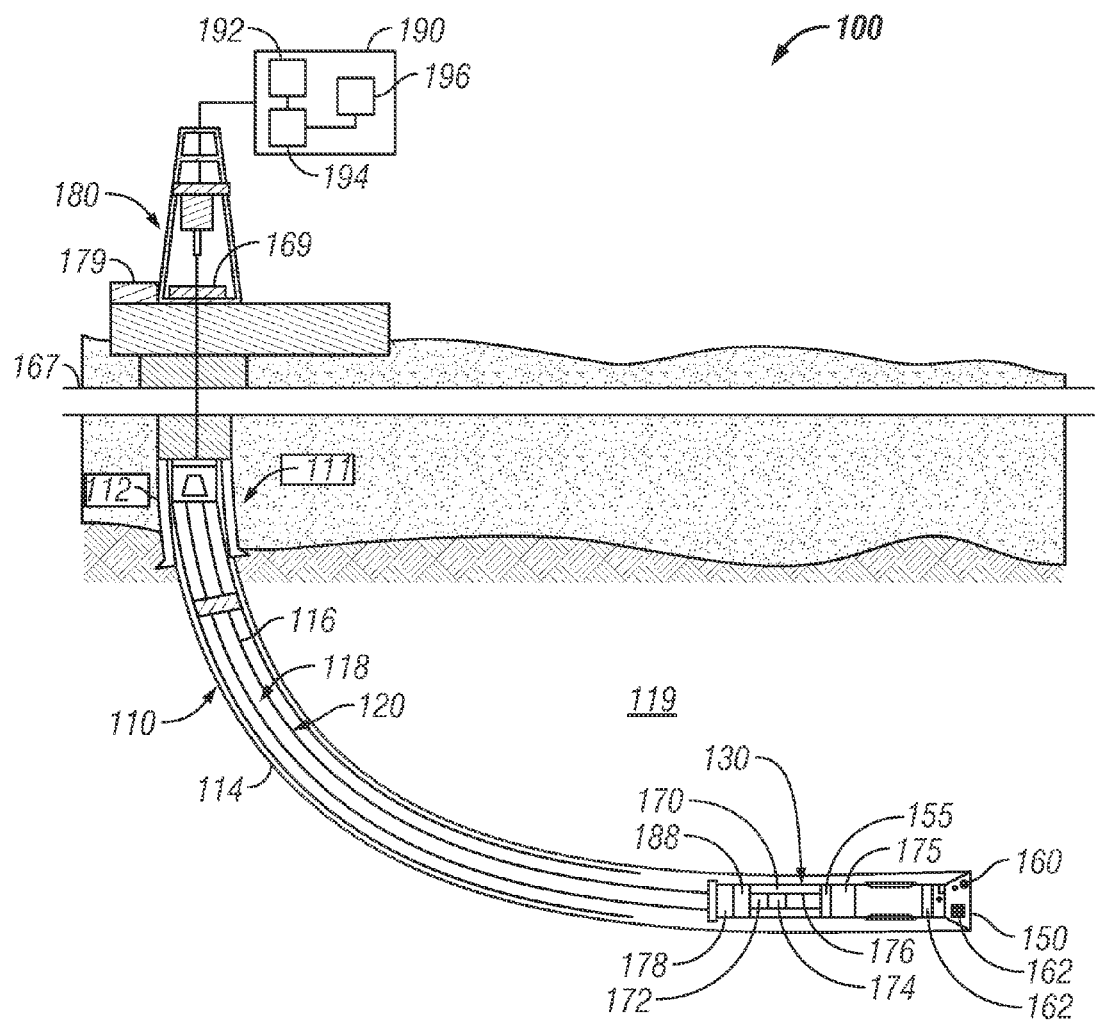
FIG. 1 is a schematic diagram of a drilling system that includes a drill string with a drill bit made according to one embodiment of the disclosure for drilling wellbores.

FIG. 1 is a schematic diagram of an exemplary drilling system 100 that may utilize drill bits disclosed herein for drilling wellbores. FIG. 1 shows a wellbore 110 that includes an upper section 111 with a casing 112 installed therein and a lower section 114 that is being drilled with a drill string 118. The drill string 118 includes a tubular member 116 that carries a drilling assembly 130 (also referred to as the bottomhole assembly or "BHA") at its bottom end. The tubular member 116 may be made up by joining drill pipe sections or it may be coiled tubing. A drill bit 150 is attached to the bottom end of the BHA 130 for disintegrating the rock formation to drill the wellbore 110 of a selected diameter in the formation 119. Not shown are devices such as thrusters, stabilizers, centralizers, and devices such as steering units for steering the drilling assembly 130 in a desired direction. The terms wellbore and borehole are used herein as synonyms.

The drill string 118 is shown conveyed into the wellbore 110 from a rig 180 at the surface 167. The exemplary rig 180 shown in FIG. 1 is a land rig for ease of explanation. The apparatus and methods disclosed herein may also be utilized with rigs used for drilling offshore wellbores. A rotary table 169 or a top drive (not shown) coupled to the drill string 118 at the surface may be utilized to rotate the drill string 118 and thus the drilling assembly 130 and the drill bit 150 to drill the wellbore 110. A drilling motor 155 (also referred to as "mud motor") may also be provided to rotate the drill bit. A control unit (or controller) 190, which may be a computer-based unit, may be placed at the surface 167 for receiving and processing data transmitted by the sensors in the drill bit and other sensors in the drilling assembly 130 and for controlling selected operations of the various devices and sensors in the drilling assembly 130. The surface controller 190, in one embodiment, may include a processor 192, and a data storage device (or a computer-readable medium) 194 for storing data and computer programs 196. The data storage device 194 may be any suitable device, including, but not limited to, a read-only memory (ROM), a random-access memory (RAM), a flash memory, a magnetic tape, a hard disc and an optical disk. To drill a wellbore, a drilling fluid from a drilling fluid source 179 is pumped under pressure into the tubular member 116. The drilling fluid discharges at the bottom of the drill bit 150 and returns to the surface via the annular space (also referred as the "annulus") between the drill string 118 and the inside wall of the wellbore 110.

Still referring to FIG. 1, the drill bit 150 may include one or more radiation sources 162. In one aspect, the radiation source may be a gamma ray source, such as Cesium-137 (CS-137. When gamma ray radiation is induced into a formation, the induced gamma rays interact with the formation and scatter. The drill bit further may include a sensor configured to detect gamma rays from the formation scattered in response to the gamma rays induced by the gamma ray source. Such a sensor may also be utilized to detect naturally-occurring gamma rays in the formation. Naturally-occurring gamma rays are gamma rays that are emitted by the formation in the absence of induced gamma rays from a radiation source. Such naturally-occurring gamma rays are referred to herein as passive gamma rays and the mode of operation in which passive gamma rays are detected is referred to as the passive mode. In another aspect, the source 162 may be a neutron source, such as an Americium-241/Beryllium (AmBe) source. When neutron radiation is induced in the formation, neutrons scatter in the formation. In such a case, sensor in the drill bit detects scattered neutrons from the formation. Sometimes, the induced radiation may cause emission of secondary radiation in the formation. Both the scattered and secondary radiation are referred to herein as secondary radiation and the mode of operation in which secondary radiation is detected is referred to as the active mode. In another aspect, the drill bit may include both neutron and the gamma ray sources and sensors to detect both the gamma rays and the neutrons from the formation. In yet another aspect, the radiation from the source 162 may be selectively exposed to the formation so that the sensor 160 detects secondary radiation during specific time periods after the formation has been exposed to such radiation. The passive gamma rays may be detected during time periods when the radiation from the source is not exposed to the formation. The drilling assembly 130 may further include one or more downhole sensors (also referred to as the measurement-while-drilling (MWD) sensors (collectively designated by numeral 175) and at least one control unit (or controller) 170 for processing data received from the MWD sensors 175 and the drill bit 150. The controller 170 may include a processor 172, such as a microprocessor, a data storage device 174 and a program 176 for use by the processor to process downhole data and to communicate data with the surface controller 190 via a two-way telemetry unit 188. The telemetry unit 188 may utilize communication uplinks and downlinks. Exemplary communications may include mud pulse telemetry, acoustic telemetry, electromagnetic telemetry, and one or more conductors (not shown) positioned along the drill string 118 (also referred to a wired-pipe). The data conductors may include metallic wires, fiber optical cables, or other suitable data carriers. A power unit 178 provides power to the electrical sensors and circuits in the drill bit and the BHA. In one embodiment, the power unit 178, may include a turbine driven by the drilling fluid and an electrical generator.

The MWD sensors 175 may include sensors for measuring near-bit direction (e.g., BHA azimuth and inclination, BHA coordinates, etc.), dual rotary azimuthal radiation, bore and annular pressure (flow-on & flow-off), temperature, vibration/dynamics, multiple propagation resistivity, and sensors and tools for making rotary directional surveys. Exemplary sensors may also include sensors for determining parameters of interest relating to the formation, borehole, geophysical characteristics, borehole fluids and boundary conditions. These sensors include formation evaluation sensors (e.g., resistivity, dielectric constant, water saturation, porosity, density and permeability), sensors for measuring borehole parameters (e.g., borehole size, and borehole roughness), sensors for measuring geophysical parameters (e.g., acoustic velocity and acoustic travel time), sensors for measuring borehole fluid parameters (e.g., viscosity, density, clarity, rheology, pH level, and gas, oil and water contents), boundary condition sensors, and sensors for measuring physical and chemical properties of the borehole fluid. Details of the radiation sources and sensors in the drill bit are described in more detail in reference to FIGS. 2-4.

Figure 2:
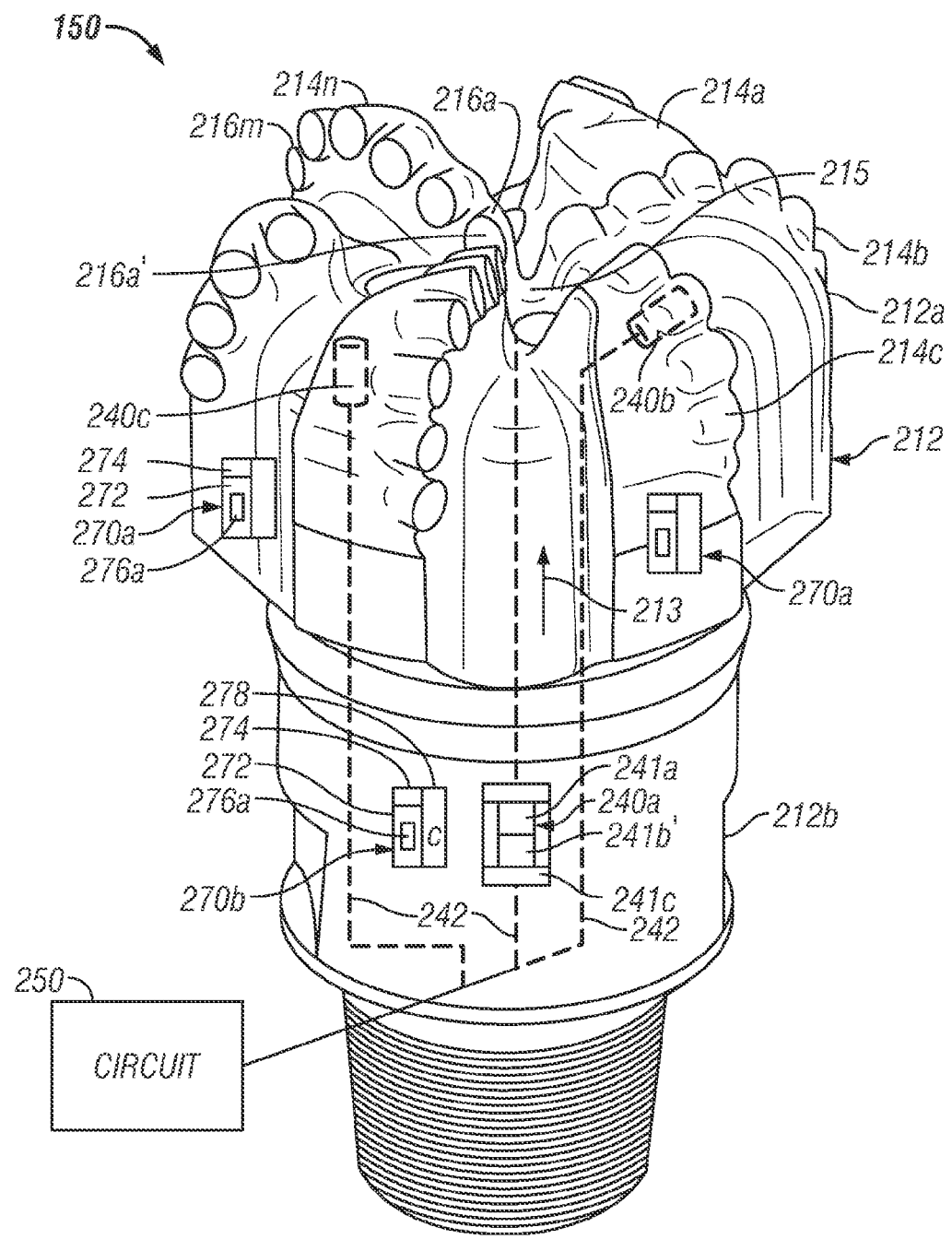
FIG. 2 is an isometric view of an exemplary drill bit showing placement of a radiation sensor in the drill bit and an electrical circuit for at least partial processing of the signals generated by the radiation sensor according to one embodiment of the disclosure.

FIG. 2 shows an isometric view of an exemplary drill bit 150 that may include a radiation sensor (generally denoted by numeral 240) and a source (generally denoted by numeral 270) placed at suitable locations in the drill bit. A polycrystalline diamond compact (PDC) drill bit is shown for explanation purposes. Any other type of drill bit may be utilized for the purpose of this disclosure. The drill bit 150 is shown to include a drill bit body 212 comprising a cone 212a and a shank 212b. The cone 212n includes a number of blade profiles (or profiles) 214a, 214b, . . . 214n. A number of cutters are placed along each profile. For example, profile 214a is shown to contain cutters 216a-216m. All profiles are shown to terminate at the bottom or face 215 of the drill bit 150. Each cutter has a cutting surface or cutting element, such as element 216a' of cutter 216a, that engages the rock formation when the drill bit 150 is rotated during drilling of the wellbore.

FIG. 2 illustrates a variety of positions or locations for the radiation sensor 240. In one arrangement, a radiation sensor 240a may be placed in the shank 212b. In another embodiment, a radiation sensor 240b may be integrated into a cutter. Such sensors may be placed at any other suitable locations in the drill bit 150, including, but not limited to the crown 212a, such as radiation sensor 240c. The radiation sensors 240a, b, c may be configured to receive natural radiation and/or secondary radiation from the formation axially ahead of the drill bit or from azimuthal locations. Conductors 242 provide signals from the sensor package 240 to a circuit 250 for processing sensor signals. The circuit 250 or a portion thereof may be placed in the drill bit 150 or outside the drill bit. The circuit 250, in one aspect, amplifies signals from the sensor 240 and processes such signals to provide a desired property of interest of the formation.

In one aspect, a gamma ray sensor may utilize a sensor element, such as a scintillation crystal, such as sodium iodide (NaI) crystal, optically coupled to a photomultiplier tube. Output signals from the photomultiplier tube may be transmitted to a suitable electronics package which may include pre-amplification and amplification circuits. The amplified sensor signals may be transmitted to the processor 172. In certain applications, scintillation gamma ray detectors, such as those incorporating NaI crystal, may not be suitable due to their size and use of photomultiplier tubes. In certain other embodiments of the disclosure, solid state gamma ray detectors may be utilized. An example of such a device is shown in U.S. Pat. No. 5,969,359 to Ruddy et al. Solid state detectors are relatively small and may be oriented in any direction in the drill bit. Another embodiment of the disclosure may utilize a photodiode detector whose long-wavelength cutoff is in the short-wavelength range and has reduced temperature sensitivity. The photodiode may be matched with scintillation devices having an output matching the response curve of the photodiode for use with nuclear logging devices. An exemplary scintillation device is disclosed in U.S. Pat. No. 7,763,845 to Estes et al., having the same assignee as the present disclosure, the contents of which are incorporated herein by reference. In some embodiments of the present disclosure a downhole cooling device may be provided for the sensor, such as a device using quantum thermo-tunneling of electrons. An exemplary cooling process is disclosed in U.S. Pat. No. 7,571,770 to DiFoggio et al., having the same assignee as the present disclosure and the contents of which are incorporated herein by reference.

Still referring to FIG. 2, a radiation source may be placed at any suitable location in the drill bit 150. As an example, FIG. 2 shows a source 270a placed in the cone 212a or a source 270b in the shank 212b. As noted above, source 270a may be any suitable such as a cesium source, including, but limited to CS-137 or another gamma source and an AmBe or another neutron source. In one aspect, source 270a or 272b may include a source element 276a enclosed in a casing 272 having a window 274 that can be selectively opened and closed for selected time periods (also referred to as time windows). In this manner radiation from the source may be induced into the formation for selected time periods. The sensors 240a, b, c detect radiation scattered from the formation responsive to the induced radiation and/or detect naturally-occurring gamma rays as the case may be. The source 270a and 270b may further include a control unit 278 for selectively opening and closing the window 274 to selectively activate and deactivate the source element 276a and 276b as the case may be. In one aspect, the control unit 278 may be a hydraulically-operated device, such as a movable member (for example a shutter) driven by flow of the drilling fluid, or an electrically-operated device, such as an electric motor. Fluid may be supplied in reverse directions to open and close the window 274.

In aspects, sensor packages 240a, b, c may be configured to utilize gamma ray spectroscopy to determine the amounts of potassium, uranium and thorium concentrations that naturally occur in a geological formation. Measurements of gamma radiation from these elements are possible because these elements are associated with radioactive isotopes that emit gamma radiations at characteristic energies. The amount of each element present within a formation may be determined by its contribution to the gamma ray flux at a given energy. Measuring gamma radiation of these specific element concentrations is known as spectral stripping, which refers to the subtraction of the contribution of unwanted spectral elements within an energy window. The energy window includes upper and lower boundaries selected to encompass the characteristic energy(s) of the desired element within the gamma ray energy spectrum. Spectral stripping may be accomplished in practice by calibrating the tool initially in an artificial formation with known concentrations of potassium, uranium and thorium under standard conditions. Illustrative devices for detecting or measuring naturally occurring gamma radiation include magnetic spectrometers, scintillation spectrometers, proportional gas counters and semiconductors with solid state counters. In another aspect, a gamma ray source and a gamma ray detector may be configured to measure gamma rays induced into the formation by the source and scattered by the formation. The energy spectrum of the recorded gamma rays can then be processed to measure the formation density. In another aspect, the source and sensor may be configured to detect neutrons for determining a formation property, including neutron porosity.

In aspects, a bit-based gamma ray sensor configured to detect naturally-occurring gamma rays may provide an early indication or a first indication of a lithology or change in lithology in the vicinity of the drill bit 150. In embodiments, the signals from the bit-based gamma ray sensor may be used to estimate an energy signature for the formation being drilled. Thereafter, the detected energy signature may be compared or correlated with the energy signatures from reference formations having a known lithology. This comparison or correlation may be used to estimate or predict the lithology of the formation being drilled. In one embodiment, the sensor package 240 may provide the primary or only measurements from which a lithology or a change in lithology may be estimated. In other embodiments, the measurements provided by the sensor package 240 may be utilized in conjunction with measurements provided by the formation evaluation sensors of in MWD system 170 to estimate a lithological characteristic or a change in a lithological characteristic. Analysis of passive gamma rays provides differentiation between different types of rocks, such as shale and sand. Analysis of scattered or active gamma rays provides quantitative measures of rock constituents, such as thorium, potassium and uranium, which measures may be used to estimate rock properties, such as density. The estimated properties of the formation may be utilized to alter one or more drilling parameters. For example, sand is much harder than shale. Therefore, when a drill bit moves, for example, from a shale formation to a sand formation, the driller using such information provided by gamma ray analysis may opt to increase weight on bit and/or reduce rotational speed of the drill bit. In the same manner, when moving from sand to shale, the driller may opt to alter the drilling parameters to obtain a higher rate of penetration.

Figure 3:
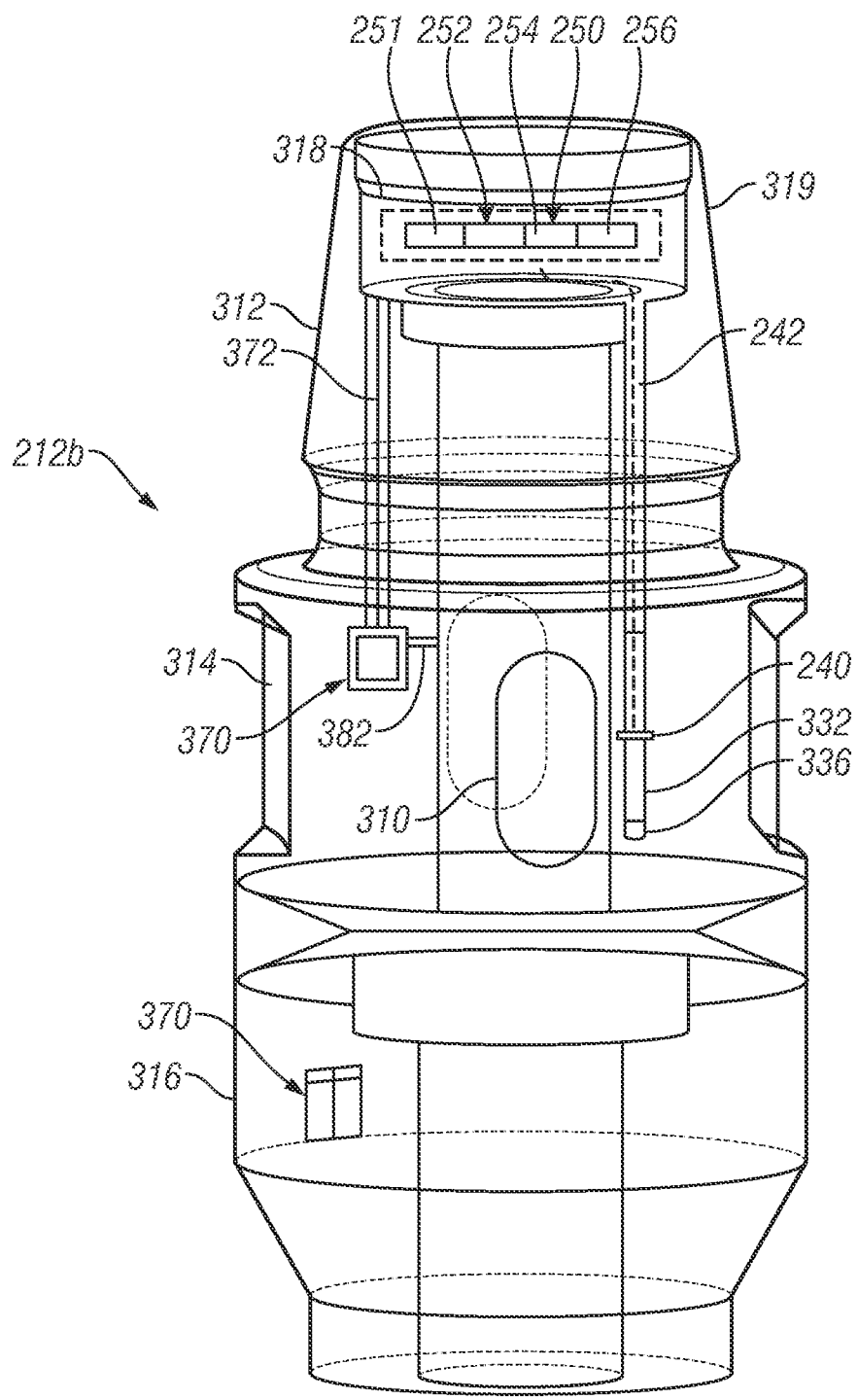
FIG. 3 shows the placement of radiation sensors and a source in an exemplary drill bit according to one embodiment of the disclosure.

FIG. 3 shows certain details of the shank 212b according to one embodiment of the disclosure. The shank 212b includes a bore 310 for supplying drilling fluid to the cone 212a of the drill bit 150 and one or more circular sections surrounding the bore 310, such as a neck section 312, a recessed section 314 and a circular section 316. The upper end of the neck section 312 includes a recessed area 318. Threads 319 on the neck section 312 connect the drill bit 150 to the drilling assembly 130 (FIG. 1). The sensor package 240 containing the radiation sensor 332 may be placed at any suitable location in the shank. In one aspect, the sensor package 240 may be placed in a recess 336 in section 314 of the shank. Conductors 242 may be run from the sensors 332 to an electric circuit 250 in the recess 318. The circuit 250 may be coupled to the downhole controller 170 (FIG. 1) by communication links that run from the circuit 250 to the controller 170. In one aspect, the circuit 250 may include an amplifier that amplifies the signals from the sensors 332 and an analog-to-digital (A/D) converter that digitizes the amplified signals (collectively shown by numeral 251). The circuit 250 may further include processor 252 (such as a microprocessor), a storage device 254 (such as memory device) and programs 256, accessible to the processor 252 for processing of sensor signals. The communication between the circuit 250 and controller 170 may be provided by direct connections, acoustic telemetry or any other suitable method. Power to the electrical circuit 250 may be provided by a battery or by a power generator in the BHA 130 (FIG. 1) via electrical conductors. In another aspect, the sensor signals may be digitized without prior amplification. Also, all of the components of the sensor package 240 may be co-located or separately located in the drill bit. For example, the sensing elements may be positioned proximate a cutter and the signal conditioning elements may be positioned in the shank 212b. The sensor package 240 may be positioned at a surface of the bit body 150. If the sensing elements are recessed in the drill bit 150, then a window formed of a media that is transparent to radiation may be interposed between the sensing element and the surface of the bit body 150. I addition, the source 270 may be placed in any suitable location, including a cavity 370. Power to the control unit 272 of the source may be provided by the battery in the circuit 250 or from the BHA 130. If fluid is used to open and close the source shutter, drilling fluid may be diverted to the source control unit via a fluid channel 380 via a control valve 382. Each time a fluid is provided to the window, it changes from its current position to the other position, such as from its open position to its close position or vice versa.

Referring to FIGS. 1-3, during drilling operations, the signals from the sensors 332 or the circuit 250 may be sent to the controller 170. In one mode of operation, utilizing downhole drilling controls, controller 170 may process such signals to estimate a lithological characteristic. Thereafter, the processor 172 in the controller 170 may control one or more drilling parameters based at least in part on the estimation of the lithology. For instance, the processor 172 may be configured to send commands to alter the weight-on-bit or alter rotational speed of the drill bit 150. For example, such commands may be issued to reduce WOB or RPM because a relatively hard layer lies ahead of the drill bit. In another instance, the command may be to increase WOB or RPM because a relatively soft layer lies ahead of the drill bit 150. Stated generally, drilling personnel and/or the surface/downhole control devices can initiate changes to the drilling parameters to optimally drill a given formation as the drilling assembly 130 enters that formation.

In another mode of operation utilizing surface control, the sensor signals or the computed values of the measured radiation may be determined by the controller 170 and sent to the surface controller 190 for further processing. The measured radiation may be used to estimate an energy signature of the formation being drilled. Thereafter, this estimated energy signature may be compared against the energy signatures of formations having a known lithology to estimate the lithology of the formation being drilled. In one aspect, the surface controller 190 may utilize any such information to cause one or more changes, including, but not limited to, altering weight-on-bit, rotational speed of the drill bit, and the rate of the fluid flow so as to increase the efficiency of the drilling operations and extend the life of the drill bit 150 and drilling assembly 130. Early implementation of adjustments to drilling parameters may provide more efficient drilling and extend the life of the drill bit 150 and/or BHA.

In still another mode of operation, an estimated property of the formation utilizing data from a sensor package 240 may be utilized to geosteer the drilling assembly 130. The measurements furnished by the sensor package 240 may be continuously or periodically processed by the processor 172 and/or 192 to estimate the location of a particular subsurface feature or features. That is, the detected energy signatures may be compared with the predicted energy signature of the subsurface feature or features. This comparison may be utilized to determine whether the subsurface feature is present and the relative location of that subsurface feature. Geosteering objectives may include drilling a deviated borehole at a selected depth proximate to an identified oil-water contact, drilling a wellbore or navigating a formation above an oil-water contact, maintaining a drilling depth below a gas cap, avoiding a shale lens, and/or steering a course relative to bed boundaries that are of interest in horizontal drilling. In one embodiment, the radiation sensor measurements may be used to estimate the location of or the distance to fluid contacts, bed boundaries, and other subsurface features that may be utilized to steer the drilling assembly 150. In one preferred closed-loop mode of operation, the processors 172 and/or 192 include instructions relating to a desired well profile or trajectory and/or desired characteristics of a target formation. The processors 172 and/or 192 maintain control over aspects of the drilling activity to maintain a desired position or location vis-à-vis a subsurface formation of interest. For instance, during an exemplary operation, the sensor package 240 provides data relating to a naturally occurring gamma ray emissions. The processor 172 may use this data to evaluate the formation ahead of the drill bit 150 and determine the proximity, location or orientation of the drilling assembly 130 relative to a bed boundary or other subsurface feature and, if needed, issue steering instructions that prevent the drilling assembly 130 from exiting the target formation or entering into an undesirable formation. This automated control of the drilling assembly 130 may include periodic two-way telemetric communication with the surface control unit 190 that receives selected sensor data and processed data from the downhole processor 172 and issues command instructions thereto. The command instructions transmitted by the control unit 190 may, for instance, be based on calculations based on data received from surface sensors (not shown) and downhole sensors. The processor 172 reconfigures the steering unit (not shown) of the drilling assembly 130 to re-orient the drilling assembly 130 to drill in the desired direction.

Thus, in one aspect the disclosure provides a drill bit that in one embodiment includes a source in the bit configured to induce radiation into a formation surrounding the drill bit during drilling of a wellbore and a sensor in the bit body configured to detect radiation from the formation being drilled during drilling of the wellbore. In one aspect, the source includes a radioactive element that may selectively expose the radiation to the formation. In one embodiment, the control unit includes a member that in a first position exposes the radiation from the source to the formation and in a second position prevents the radiation from the source from being exposed to the formation. In another aspect, the control unit includes a power unit configured to move the member between the first position and the second position. In aspects, the power unit may be an electrically-operated unit including an electric motor, a hydraulically-operated device or another suitable device. The hydraulically-operated device may include a fluid supply line configured to supply a fluid, such as the drilling fluid, for moving the member between the first position and the second position. A suitable flow control device, such as a valve, may control the supply of the fluid to the source. In another aspect, a control circuit in the drill bit may be provided to process signals provided by the sensor. In yet another aspect, the sensor may be integrated into a cutter of the drill bit, positioned in the shank or a cone of the drill bit. Further, a communication link from the control circuit may provide data communication with a remote device, such as a processor.

In yet another aspect, a method of making a drill bit is provided, which method in one embodiment includes: placing a radiation source in the drill bit for inducing radiation into a formation surrounding the drill bit during drilling of a wellbore, and placing in the drill bit a radiation sensor configured to detect radiation from the formation and provide signals representative of the radiation detected radiation from the formation being drilled. In one aspect, placing the source in the drill bit may further comprise placing a radioactive element in the drill bit and placing a control unit in the drill bit for selectively exposing radiation from the radioactive element to the formation. In yet another aspect, a method for drilling a wellbore in an earth formation is provided, which method, in one embodiment, may include: drilling the wellbore with a drill bit; inducing radiation into the formation by a source in the drill bit; and detecting radiation from the formation responsive to the induced radiation by a sensor in the drill bit; and providing signals representative of the detected radiation. The method may further include stopping inducing radiation into the formation from the source; and detecting naturally-occurring gamma rays in the formation and providing signals representative of the detected naturally-occurring gamma rays. In yet an other aspect, the method may further include processing signals representative of the naturally-occurring gamma rays and signals representative of radiation detected from the formation responsive to the induced radiation to estimate a property of interest of the formation. The property of interest may be one or more of: a location of a bed boundary; a lithology of a formation being drilled; density of the formation; and neutron porosity of the formation. The method may further include adjusting a drilling parameter based at least in part on information obtained from processing the signals representative of the detected radiation. The drilling parameter may include one or more of: (i) weight-on-bit; (ii) rotational speed of the drill bit; and (iii) supply of a drilling fluid to a drill string carrying the drill bit.

The foregoing description is directed to particular embodiments for the purpose of illustration and explanation. It will be apparent, however, to persons skilled in the art that many modifications and changes to the embodiments set forth above may be made without departing from the scope and spirit of the concepts and embodiments disclosed herein. It is intended that the following claims be interpreted to embrace all such modifications and changes.

The invention claimed is:

1. A drill bit, comprising:
a bit body;
a source in the bit body configured to induce radiation into a formation surrounding the drill bit during drilling of a wellbore;
a movable member that in a first position exposes the formation to the radiation from the source and in a second position prevents the formation from being exposed to the radiation from the source;
a control unit configured to move the movable member to selectively expose the formation to the radiation from the source; and
at least one sensor in the bit body configured to detect radiation responsive to the induced radiation in the formation during drilling of the wellbore.

2. The drill bit of claim 1, wherein the source is selected from a group consisting of: a gamma ray source; and a neutron source.

3. The drill bit of claim 1, wherein the at least one radiation sensor includes a sensor from a group consisting of a: neutron sensor; and gamma ray sensor.

4. The drill bit of claim 1, wherein the control unit includes a power unit configured to move the movable member between the first position and the second position.

5. The drill bit of claim 4, wherein the power unit is selected from a group consisting of: an electrically-operated unit; and a hydraulically-operated unit.

6. The drill bit of claim 5 further comprising a valve configured to control supply of a fluid to the movable member to move the movable member between the first and second positions.

7. The drill bit of claim 1, wherein the control circuit is further configured to process signals provided by the at least one sensor.

8. The drill bit of claim 1, wherein the at least one sensor is integrated into a cutter of the drill bit.

9. The drill bit of claim 1, wherein the at least one sensor is positioned in one of a shank, cone, blade or cutter of the drill bit.

10. The drill bit of claim 1 further comprising a communication link configured to provide data communication between a remote device and the at least one sensor.

11. A method of providing a drill bit, comprising:
placing a source in the drill bit for inducing radiation into a formation surrounding the drill bit during drilling of a wellbore;
placing a movable member in the drill bit that is configured to move between a first position that exposes the formation to the radiation from the source and a second position that prevents the formation from being exposed to the radiation from the source;
placing a control unit in the drill bit configured to move the movable member to selectively expose the formation to the radiation from the source;
placing in the bit body a sensor configured to detect radiation responsive to the induced radiation in the formation and provide signals representative of the detected radiation; and
processing the signals to estimate a property of the formation.

12. The method of claim 11 further comprising providing a control unit in the drill bit configured to selectively expose radiation from the source to the formation.

13. A method of drilling a wellbore in an earth formation, comprising:

drilling the wellbore with a drill bit in the formation that includes a radiation source;

moving a movable member to selectively expose the formation to the radiation from the source, wherein, in a first position, the movable member exposes the formation to the radiation from the radiation source and, in a second position, the movable member prevents the formation from being exposed to the radiation from the radiation source;

inducing in the formation radiation from the radiation source in the drill bit;

detecting radiation from the formation responsive to the induced radiation by a sensor in the drill bit and providing signals representative of the detected radiation; and processing the signals to estimate a property of the formation.

14. The method of claim 13 further comprising:

stopping inducing radiation into the formation from the source for a selected period of time;

detecting naturally-occurring gamma rays in the formation and providing signals representative of such detected naturally-occurring gamma rays; and estimating a property of the formation using the signals representative of the detected-naturally-occurring gamma rays.

15. The method of claim 14 further comprising processing signals representative of naturally-occurring gamma rays and signals representative of radiation detected from the formation in response to induced radiation to estimate a property of interest of the formation.

16. The method of claim 15, wherein the property of the formation is selected from a group consisting of: a bed boundary condition; a rock property of the formation; formation density; formation porosity; and formation sigma.

17. The method of claim 13 further comprising adjusting at least one drilling parameter based on information obtained from processing of the signals.

18. The method of claim 17, wherein the at least one drilling parameter is selected from a group consisting of: (i) weight-on-bit and (ii) rotational speed of the drill bit; and (iii) supply of a fluid.

* * * * *